US012091730B2

United States Patent
Sungail et al.

(10) Patent No.: US 12,091,730 B2
(45) Date of Patent: Sep. 17, 2024

(54) SPHERICAL TANTALUM-TITANIUM ALLOY POWDER, PRODUCTS CONTAINING THE SAME, AND METHODS OF MAKING THE SAME

(71) Applicant: Global Advanced Metals USA, Inc., Wellesley Hills, MA (US)

(72) Inventors: Craig Sungail, Chadds Ford, PA (US); Aamir Abid, Spring City, PA (US)

(73) Assignee: GLOBAL ADVANCED METALS USA, INC., Wellesley Hills, MA (US)

(*) Notice: Subject to any disclaimer, the term of this patent is extended or adjusted under 35 U.S.C. 154(b) by 0 days.

(21) Appl. No.: 16/899,603

(22) Filed: Jun. 12, 2020

(65) Prior Publication Data

US 2021/0016348 A1 Jan. 21, 2021

Related U.S. Application Data

(60) Provisional application No. 62/876,018, filed on Jul. 19, 2019.

(51) Int. Cl.
| | |
|---|---|
| *C22C 14/00* | (2006.01) |
| *B22F 1/05* | (2022.01) |
| *B22F 1/065* | (2022.01) |
| *B22F 1/142* | (2022.01) |
| *B22F 3/11* | (2006.01) |
| *B22F 9/06* | (2006.01) |
| *B22F 9/16* | (2006.01) |
| *B22F 10/00* | (2021.01) |
| *B22F 10/12* | (2021.01) |
| *B22F 10/14* | (2021.01) |
| *B22F 10/25* | (2021.01) |
| *B22F 10/28* | (2021.01) |
| *B22F 10/34* | (2021.01) |
| *B33Y 10/00* | (2015.01) |
| *B33Y 70/00* | (2020.01) |
| *B33Y 80/00* | (2015.01) |
| *C22C 27/02* | (2006.01) |

(52) U.S. Cl.
CPC ............... *C22C 14/00* (2013.01); *B22F 1/05* (2022.01); *B22F 1/065* (2022.01); *B22F 1/142* (2022.01); *B22F 3/11* (2013.01); *B22F 9/06* (2013.01); *B22F 9/16* (2013.01); *B22F 10/12* (2021.01); *B22F 10/14* (2021.01); *B22F 10/25* (2021.01); *B22F 10/28* (2021.01); *B33Y 70/00* (2014.12); *B33Y 80/00* (2014.12); *C22C 27/02* (2013.01); *B22F 10/00* (2021.01); *B22F 10/34* (2021.01); *B22F 2301/205* (2013.01); *B22F 2304/10* (2013.01); *B33Y 10/00* (2014.12)

(58) Field of Classification Search
None
See application file for complete search history.

(56) References Cited

U.S. PATENT DOCUMENTS

| | | |
|---|---|---|
| 4,945,452 A | 7/1990 | Sturmer et al. |
| 5,200,595 A | 4/1993 | Boulos et al. |
| 5,498,446 A | 3/1996 | Axelbaum et al. |
| 5,837,121 A | 11/1998 | Kinard et al. |
| 5,935,408 A | 8/1999 | Kinard et al. |
| 5,993,513 A | 11/1999 | Fife |
| 6,072,694 A | 6/2000 | Hahn et al. |
| 6,136,176 A | 10/2000 | Wheeler et al. |
| 6,162,345 A | 12/2000 | Kinard et al. |
| 6,191,013 B1 | 2/2001 | Hahn et al. |
| 6,312,642 B1 | 11/2001 | Fife |
| 6,540,851 B2 | 4/2003 | Huber, Jr. et al. |
| 6,643,121 B1 | 11/2003 | Huntington |
| 6,699,767 B1 | 3/2004 | Huntington |
| 6,804,109 B1 | 10/2004 | Hahn et al. |
| 6,813,140 B1 | 11/2004 | Huntington |
| 6,849,292 B1 | 2/2005 | Huntington |
| 6,870,727 B2 | 3/2005 | Edson et al. |
| 6,896,782 B2 | 5/2005 | Melody et al. |
| 7,442,227 B2 | 10/2008 | Rosen et al. |
| 7,803,235 B2 | 9/2010 | Venigalla |
| 2008/0078268 A1 | 4/2008 | Shekhter et al. |
| 2016/0158412 A1* | 6/2016 | Jin .................. C23C 28/345 424/9.1 |
| 2017/0197250 A1* | 7/2017 | Oh .................... B02C 18/062 |
| 2019/0084048 A1* | 3/2019 | Ivanov .............. B22F 9/082 |

(Continued)

FOREIGN PATENT DOCUMENTS

| CN | 102965531 A | 3/2013 |
|---|---|---|
| CN | 105821247 A | 8/2016 |
| CN | 106735280 A | 5/2017 |

(Continued)

OTHER PUBLICATIONS

Qian et al., "Origin of dramatic oxygen solute strengthening effect in titanium", Feb. 6, 2015, Science, Research vol. 347 Issue 6222, pp. 635-639. (Year: 2015).*
Barzilai et al., "Evaluation of the tantalum-titanium phase diagram from ab-initio calculations", Sep. 1, 2016, Acta Materialia, 120, pp. 255-263. (Year: 2016).*
Ikeda et al., "Effects of Sn and Zr Additions on Phase Constitution and Aging Behavior of Ti-50 mass% Ta Alloys Quenched from B Single Phase Region," Materials Transactions, 2004, vol. 45. No. 4, pp. 1106-1112.
Niinomi et al., "Biomedical Implant Devices Fabricated from Low Young's Modulus Titanium Alloys Demonstrating High Mechanical Biocompatibility," Jun. 20, 2019, pp. 1-17, www.sigmaaldrich.com/technical-documents/article/materials-science/biomedical-implant-devices.html.

(Continued)

*Primary Examiner* — Xiaobei Wang
(74) *Attorney, Agent, or Firm* — Kilyk & Bowersox, P.L.L.C.

(57) ABSTRACT

A tantalum-titanium alloy powder that is highly spherical is described. The alloy powder can be useful in additive manufacturing and other uses. Methods to make the alloy powder are further described as well as methods to utilize the alloy powder in additive manufacturing processes. Resulting products and articles using the alloy powder are further described.

39 Claims, No Drawings

(56) References Cited

U.S. PATENT DOCUMENTS

| | | | |
|---|---|---|---|
| 2019/0272958 A1* | 9/2019 | Sungail | B22F 1/142 |
| 2022/0023941 A1* | 1/2022 | Weinmann | B22F 9/082 |

FOREIGN PATENT DOCUMENTS

| | | |
|---|---|---|
| CN | 109434117 A | 3/2019 |
| EP | 2073947 A2 | 7/2009 |
| JP | S62199745 A | 9/1987 |
| JP | 2006104559 A | 4/2006 |
| JP | 2017222904 A | 12/2017 |

OTHER PUBLICATIONS

Huber "Structure and Properties of Titanium Tantalum Alloys for Biocompatibility Dissertation," Graduate Program in Materials Science and Engineering, The Ohio State University, 2016 (143 pages).

Sing et al. "Selective laser melting of titanium alloy with 50 wt% tantalum: Microstructure and mechanical properties," Journal of Alloys and Compounds, 2016, vol. 660, pp. 461-470.

Soro et al. "Evaluation of the mechanical compatibility of additively manufactured porous Ti—25Ta alloy for load-bearing implant applications," Journal of the Mechanical Behavior of Biomedical Materials, Sep. 2019, vol. 97, pp. 149-158.

Mukherjee et al. "Printability of alloys for additive manufacturing," Scientific Reports, 6:19717, DOI:10.1038/srep19717 (2016), pp. 1-8.

Office Action issued in corresponding Taiwan Patent Application No. 109119629 dated Dec. 22, 2020 (with English translation) (16 pages).

Yin et al., "Titanium-Tantalum Alloy Powder Produced by the Plasma Rotating Electrode Process (PREP)," Key Engineering Materials, 2018, vol. 770. pp. 18-22.

Editorial Department of Vmaker "Hundreds of 3D-Printing Methods? Summary of Four Major Methods," Jan. 2016/vamker.tw, https://vmaker.tw/archives/3650 (with English translation) (2 pages).

International Search Report and Written Opinion issued in corresponding International Patent Application No. PCT/US2020/037347 dated Apr. 13, 2021 (13 pages).

Olson, "Particle Shape Factors and Their Use in Image Analysis-Part 1: Theory," Journal of GXP Compliance, 2011, vol. 15, No. 3, pp. 85-96.

Office Action issued in corresponding Chinese Patent Application No. 202080052127.1 issued May 25, 2022 (English translation only)(11 pages).

Office Action issued in corresponding Taiwan Patent Application No. 109119629 issued Sep. 18, 2023 (with English translation)(9 pages).

Xia et al., "Novel Method for Making Biomedical Segregation-Free Ti—30Ta Alloy Spherical Powder for Additive Manufacturing," JOM, Jan. 2, 2018, vol. 70, No. 3, pp. 364-369.

* cited by examiner

SPHERICAL TANTALUM-TITANIUM ALLOY POWDER, PRODUCTS CONTAINING THE SAME, AND METHODS OF MAKING THE SAME

This application claims the benefit under 35 U.S.C. § 119(e) of prior U.S. Provisional Patent Application No. 62/876,018 filed Jul. 19, 2019, which is incorporated in its entirety by reference herein.

BACKGROUND OF THE INVENTION

The present invention relates to alloy metals, in particular tantalum-titanium alloys, and products made from tantalum-titanium alloys as well as methods of making and processing the tantalum-titanium alloys.

Among its many applications, valve metal powder, such as tantalum powder, is generally used to produce capacitor electrodes, but has other uses outside of this industry, such as in the sputtering target industry, munition area, space industry and in view of its properties, tantalum has promise in the medical and dental implant areas.

Tantalum alone has been utilized in the medical and dental implant areas, but other metals such as titanium has been utilized more often due to price and due to low density, specific strength, and biocompatibility. However, titanium used in the medical and dental implant areas, while currently and commonly used, faces several perceived disadvantages including that it is often alloyed with non-biofriendly metals such as aluminum and vanadium.

While there has been some efforts in utilizing tantalum and titanium together, most of these efforts have been combining tantalum powder and titanium powder as powder blends or as powder metallurgy products. The problem with these approaches is that a true homogeneous alloy is not formed but instead a mixture which leads to non-uniform properties due to regions of unalloyed metal (i.e., Ta and or Ti) resulting in lower than optimal physical properties such as strength, elongation, toughness and/or low cycle fatigue and weldability.

When such blended powders are used as feed material in additive manufacturing, again, inconsistent properties can be obtained in the article resulting from the additive manufacturing process, such as regions of non-alloyed Ta and or Ti and/or non-uniform grain structure which potentially can lead to poor tensile properties.

Accordingly, there is a need and desire to develop true tantalum-titanium alloy powders that can be useful in additive manufacturing and/or other industries.

SUMMARY OF THE PRESENT INVENTION

A feature of the present invention is to provide a tantalum-titanium alloy powder that can be very useful in additive manufacturing or 3D printing.

Another feature of the present invention is to provide articles, products, and/or components from additive manufacturing or 3D printing using tantalum-titanium alloy powder that is easier to use and/or provides one or more improved properties in such processes.

An additional feature of the present invention is to provide processes to make the tantalum-titanium alloy powder as well as the articles, products, and/or components containing the alloy powder.

Additional features and advantages of the present invention will be set forth in part in the description which follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purpose of the present invention, as embodied and broadly described herein, the present invention relates to tantalum-titanium alloy powder. The tantalum-titanium alloy powder includes a spherical shape wherein the powder has an average aspect ratio of from 1.0 to 1.25; an optional alloy purity of tantalum-titanium of at least 90 wt % based on total weight of the tantalum-titanium alloy powder, excluding gas impurities; an average particle size of from about 0.5 micron to about 250 microns; a true density of from 6.5 g/cc to 15.5 g/cc; an apparent density of from about 4.5 g/cc to about 11 g/cc; and a Hall flow rate of 30 sec or less. The tantalum-titanium alloy powder can be, and preferably is plasma heat-treated.

The present invention further relates to an article or an article of manufacture (or portion thereof or part thereof) made from or formed from the tantalum-titanium alloy powder of the present invention. The article or portion thereof or part thereof can be, but is not limited to, a boss for a coil set for a physical vapor deposition process, a boss that comprises open cellular structures and solid structures, a coil set or part thereof for a physical vapor deposition process, an orthopedic implant or part thereof, a dental implant or part thereof, and other medical implants or portions thereof.

Further, the present invention relates to a method to make the tantalum-titanium alloy powder of the present invention. The method can include plasma heat-treating a starting tantalum-titanium alloy powder or wire to at least partially melt at least an outer surface of said starting tantalum-titanium alloy powder or powder in an inert atmosphere to obtain a heat-treated tantalum-titanium alloy powder, and cooling the heat-treated tantalum-titanium alloy powder in an inert atmosphere to obtain the tantalum-titanium alloy powder. The starting tantalum-titanium alloy powder can be an ingot-derived material.

In addition, the present invention relates to a method for forming an article, wherein the method includes the step of additive manufacturing to form the article by utilizing the tantalum-titanium alloy powder of the present invention to form the shape of the article or part thereof. The additive manufacturing can include or comprise laser powder bed fusion, electron beam powder bed fusion, directed energy deposition, laser cladding via a powder or wire, material jetting, sheet lamination, and/or vat photopolymerization.

It is to be understood that both the foregoing general description and the following detailed description are exemplary and explanatory only and are intended to provide further explanation of the present invention, as claimed.

DETAILED DESCRIPTION OF THE PRESENT INVENTION

The present invention relates to novel tantalum-titanium alloy powders and to articles (or portions thereof) formed from the tantalum-titanium alloy powders of the present invention. The present invention further relates to methods of making the novel tantalum-titanium alloy powders as well as methods to form articles (or portions thereof) utilizing additive manufacturing techniques and processes.

As opposed to some other spheroidization technologies, plasma spheroidization provides the energy needed to melt the tantalum and titanium that form the particles quickly and produces a truly spherical powder with high purity, and/or low oxygen, and/or minimal gas entrapment and/or a controlled particle size distribution (PSD) and homogeneous alloy. While the plasma spheroidization is preferred, other spheroidization techniques can be utilized in the alternative for purposes of the present invention.

In more detail, the tantalum-titanium alloy powder of the present invention comprises, consists essentially of, consists of, or includes a spherical shape wherein the powder has an average aspect ratio of from 1.0 to 1.25; an optional alloy purity of tantalum-titanium of at least 90 wt % based on total weight of the tantalum-titanium alloy powder, excluding gas impurities; an average particle size of from about 0.5 micron to about 250 microns; a true density of from 6.5 g/cc to 15.5 g/cc; an apparent density of from about 4.5 g/cc to about 11 g/cc; and a Hall flow rate of 30 sec or less.

The tantalum-titanium alloy powder of the present invention is not a mere physical mixture of tantalum and titanium, nor is the tantalum-titanium alloy powder of the present invention considered a mechanical mixing of the two elements. Instead, the tantalum-titanium alloy powder of the present invention is a powder comprising a plurality of particles with each particle or nearly every particle having at least a Ta—Ti phase (or Ta—Ti-x phase), which is generally a solid solution of tantalum and titanium. The alloy can have a single phase. The alloy can have more than one phase. The "x" in a Ta—Ti-x phase represents one or more other elements to form a part of alloy itself, such as Nb, Zr, Hf, Mo, W, and/or Re and can be part of the single phase.

The tantalum-titanium alloy powder can have an atomic ratio or weight ratio of Ta and Ti of from about 10:90 (Ta:Ti) to about 90:10, such as, but not limited to, an atomic ratio or weight ratio of Ta and Ti of 20:80 to 80:20, or 30:70 to 70:30, or 40:60 to 60:40. As a further example, the tantalum-titanium alloy powder can have 50 wt % or at % Ta, or from about 20 wt % or at % to about 40 wt % or at % Ta, or from about 30 wt % or at % to about 40 wt % or at % Ta. As a further example, the tantalum-titanium alloy powder can have 50 wt % or at % Ti, or from about 20 wt % or at % to about 40 wt % or at % Ti, or from about 30 wt % or at % to about 40 wt % or at % Ti.

As an option, the tantalum-titanium alloy powder has a primary Ta—Ti phase that is at least 60 wt % or at %, or that is at least 70 wt % or at %, or at least 80 wt % or at %, or at least 90 wt % or at % or at least 95 wt % or at % or at least 99 wt % or at %. For instance, the tantalum-titanium alloy powder can have a primary Ta—Ti phase of from about 10 wt % or at % to 99.999 wt % or at %, or from about 10 wt % or at % to 95 wt % or at %, or from about 10 wt % or at % to 90 wt % or at %, and the like.

As a further option, the tantalum-titanium alloy powder can have an atomic ratio or weight ratio of Ta and Ti of from 20:80 (Ta:Ti) to 30:70 or from 60:40 to 70:30. Special examples include 20:80 (Ta:Ti), or 25:75, or 30:70, or 60:40, or 65:35 or 70:30. These ranges are particularly suitable to form medical articles for bone replacement. The wt % provided for Ta and Ti here and throughout are based on the total weight of the tantalum-titanium alloy powder.

The tantalum-titanium alloy powder can be particles consisting of a single phase homogeneous solid solution of Ta and Ti or a single phase homogeneous solid solution of Ta, Ti, and one or more other elements (e.g., metal element(s) and/or non-metal element(s)).

As an option, the tantalum-titanium alloy powder can be considered a binary tantalum-titanium alloy powder.

The tantalum-titanium alloy powder can have less than 500 ppm of individual grains of tantalum or titanium or both, such as less than 400 ppm, less than 300 ppm, less than 200 ppm, less than 100 ppm, less than 50 ppm, less than 25 ppm, less than 10 ppm, less than 5 ppm, or less than 1 ppm of individual grains of tantalum or titanium or both.

The tantalum-titanium alloy powder of the present invention can be a powder that is in the substantial absence of elements other than Ta and Ti. For instance, the non-gaseous elements (e.g., non-gaseous elements in general or non-gaseous metallic elements) present in the tantalum-titanium alloy powder, other than Ta and Ti, can be present in an amount of less than 1 wt %, such as from about 0.1 ppm to about 500 ppm, or from about 1 ppm to 250 ppm, or from about 1 ppm to 100 ppm, or from about 1 ppm to 50 ppm, or less than 50 ppm, or less than 25 ppm, or less than 500 ppm, based on the weight of the alloy powder.

The tantalum-titanium alloy powder can have less than 50 ppm elemental carbon, such as less than 40 ppm carbon, less than 30 ppm carbon, less than 20 ppm carbon, less than 10 ppm carbon, less than 5 ppm carbon, less than 1 ppm carbon, such as 0 ppm to 49 ppm or 0.1 ppm to 20 ppm or 0.1 ppm to 2 ppm.

The tantalum-titanium alloy powder can have less than 50 ppm elemental nitrogen, such as less than 40 ppm nitrogen, less than 30 ppm nitrogen, less than 20 ppm nitrogen, less than 10 ppm nitrogen, less than 5 ppm nitrogen, less than 1 ppm nitrogen, such as 0 ppm to 49 ppm or 0.1 ppm to 20 ppm or 0.1 ppm to 2 ppm.

The tantalum-titanium alloy powder can have less than 50 ppm elemental hydrogen, such as less than 40 ppm hydrogen, less than 30 ppm hydrogen, less than 20 ppm hydrogen, less than 10 ppm hydrogen, less than 5 ppm hydrogen, less than 1 ppm hydrogen, such as 0 ppm to 49 ppm or 0.1 ppm to 20 ppm or 0.1 ppm to 2 ppm.

The tantalum-titanium alloy powder can have less than 50 ppm elemental sulfur, such as less than 40 ppm sulfur, less than 30 ppm sulfur, less than 20 ppm sulfur, less than 10 ppm sulfur, less than 5 ppm sulfur, less than 1 ppm sulfur, such as 0 ppm to 49 ppm or 0.1 ppm to 20 ppm or 0.1 ppm to 2 ppm.

The tantalum-titanium alloy powder can have less than 100 ppm Ni, or less than 50 ppm Ni, or less than 10 ppm Ni, or 0 ppm Ni.

The tantalum-titanium alloy powder can have less than 10 ppm V, or less than 5 ppm V, or less than 1 ppm V, or 0 ppm V.

The tantalum-titanium alloy powder can have less than 10 ppm Al, or less than 5 ppm Al, or less than 1 ppm Al, or 0 ppm Al.

The tantalum-titanium alloy powder can have less than 100 ppm Fe, or less than 50 ppm Fe, or less than 10 ppm Fe, or 0 ppm Fe.

The tantalum-titanium alloy powder can have less than 100 ppm Cr, or less than 50 ppm Cr, or less than 10 ppm Cr, or 0 ppm Cr.

The tantalum-titanium alloy powder can have less than 10 ppm Cd, or less than 5 ppm Cd, or less than 1 ppm Cd, or 0 ppm Cd.

The tantalum-titanium alloy powder can have less than 10 ppm Hg, or less than 5 ppm Hg, or less than 1 ppm Hg, or 0 ppm Hg.

The tantalum-titanium alloy powder can have less than 10 ppm Pb, or less than 5 ppm Pb, or less than 1 ppm Pb, or 0 ppm Pb.

The tantalum-titanium alloy powder can have less than 10 ppm Be, or less than 5 ppm Be, or less than 1 ppm Be, or 0 ppm Be.

Except for the properties set forth above for the tantalum-titanium alloy powder with respect to spherical shape, average particle size, density and Hall flow rate, it is to be understood that there is no other critical limitations with regard to the type of tantalum-titanium alloy powder, that can be used in the additive manufacturing methods of the present invention as described herein.

The tantalum-titanium alloy powder of the present invention can be what is considered an ingot-derived tantalum-titanium alloy powder or in preferred embodiments, can be considered an ingot-derived plasma-treated tantalum-titanium alloy powder.

As indicated, the tantalum-titanium alloy powder of the present invention has a spherical shape. This shape is defined by an average aspect ratio. The average aspect ratio of the tantalum-titanium alloy powder or aspect ratio is defined herein as the ratio of the largest linear dimension of a particle (i.e., tantalum-titanium alloy powder) to the smallest linear dimension of the same particle (i.e., tantalum-titanium alloy powder) based on measuring randomly 50 particles or 100 particles or measuring randomly about 1% by weight to about 2% by weight of the batch of powder. The measuring of the alloy particles is done using Scanning Electron Micrograph (SEM) images. True spherical particles have an aspect ratio of 1.0. For purposes of the present invention, the tantalum-titanium alloy powder is considered spherical when the average aspect ratio is from 1.0 to 1.25, or from 1.0 to 1.2, or from 1.0 to 1.15, or from 1.0 to 1.1 or from 1.0 to 1.05, or from about 1.05 to about 1.25, or from 1.05 to about 1.2, or from 1.05 to about 1.1, or about 1.0.

The tantalum-titanium alloy powder of the present invention can be a high purity tantalum-titanium alloy powder, meaning if the tantalum-titanium alloy purity was measured and no other metal elements were intentionally present, the tantalum-titanium alloy powder has an alloy purity of at least 90 wt % or at least 99 wt % or at least 99.5 wt % or at least 99.9 wt %, or at least 99.99 wt %, or at least 99.999 wt %, based on total weight of the tantalum-titanium alloy powder, excluding gas impurities. The purity level can be measured by x-ray fluorescence, Inductively Coupled Plasma Atomic Emission Spectroscopy (ICP-AES) or ICP Atomic Emission Spectroscopy, or Inductively Coupled Plasma Mass Spectrometry (ICP-MS) or ICP Mass Spectrometry or Glow Discharge Mass Spectrometry (GDMS), Spark Source Mass Spec (SSMS) Analysis, EDX, or any combinations thereof. The tantalum-titanium purity can be at least 99.95 wt % Ta—Ti, at least 99.99 wt % Ta—Ti, at least 99.995 wt % Ta—Ti, or from about 99.9 wt % Ta—Ti to 99.9995 wt % Ta—Ti, or from about 99.95 wt % Ta—Ti to 99.9995 wt % Ta—Ti, or from about 99.99 wt % Ta—Ti to 99.9995 wt % Ta—Ti or other purity values or ranges.

The tantalum-titanium alloy powder has an average particle size of from about 0.5 micron to about 250 microns. The average particle size is determined by measuring randomly 50 particles using laser diffraction, or dynamic light scattering, or dynamic image analysis techniques, such as a HORIBA LA-960 or LA-300 Laser Particle Size Analyzer, or a HORIBA SZ-100 Nanopartica Instrument, or a HORIBA Camsizer or Camsizer X2 dynamic image analysis system. The average particle size can be from about 0.5 micron to about 10 microns, or from about 5 microns to about 25 microns, or from about 15 microns to about 45 microns, or from about 35 microns to about 75 microns, or from about 55 microns to about 150 microns, or from about 105 microns to about 250 microns.

The tantalum-titanium alloy powder has an apparent density of from about 4.5 g/cc to about 11 g/cc, such as from about 5 g/cc to about 10 g/cc or from about 6 g/cc to about 9 g/cc or from about 7 g/cc to about 8 g/cc or other apparent density numbers within these ranges. The apparent density is measured according to ASTM B212 standard.

The tantalum-titanium alloy powder has a Hall flow rate of 30 seconds or less. The Hall Flow test is conducted according to ASTM B213 standard, where the tantalum-titanium alloy powder is timed as it flows through the orifice of a Hall Flowmeter funnel. The Hall flow rate of the tantalum-titanium alloy powder of the present invention can be 30 seconds or less, 20 seconds or less, 15 seconds or less, 10 seconds or less, or from 4 seconds to 30 seconds, or from 4 seconds to 25 seconds, or from 5 seconds to 20 seconds, or from 6 seconds to 20 seconds, or from 4 seconds to 15 seconds, or from 4 seconds to 12 seconds, or from 5 seconds to 15 seconds, or other values in these ranges.

The starting tantalum-titanium alloy powder can be plasma heat-treated to form a plasma heat-treated powder. As an option, the tantalum-titanium alloy powder can be formed by melting (individually or as a mixture) the Ta and Ti in a tundish and either water or gas atomizing the melt to obtain powders that can be utilized in additive manufacturing.

The tantalum-titanium alloy powder can have various oxygen levels. For instance, the tantalum-titanium alloy powder can have an oxygen level of 2,500 ppm or less, or 1,000 ppm or less, or less than 500 ppm, or less than 400 ppm, or less than 300 ppm, or less than 250 ppm, or less than 200 ppm, or less than 100 ppm, or less than 50 ppm, such as from about 20 ppm to 500 ppm, from about 40 ppm to 400 ppm, from about 50 ppm to 300 ppm, from about 100 ppm to 495 ppm, or from about 150 ppm to about 400 ppm.

As an option, the tantalum-titanium alloy powder of the present invention can contain one or more other elements besides tantalum and titanium. As an option, the alloy (as part of the alloy) can contain a) at least tantalum metal, b) titanium metal, and c) i) one or more other metals and/or ii) non-metal elements and/or iii) metalloid elements.

As a further option, the tantalum-titanium alloy of the present invention can be doped or have one or more gaseous elements present as part of the alloy and/or on the surface of the alloy.

The following one or more metals can be part of tantalum-titanium alloy powder and still be considered a tantalum-titanium alloy powder for purposes of the present invention: Nb, Si, W, Mo, Re, Rh, V, Th, Zr, Hf, Cr, Mn, Sc, Y, C, B, Ni, Fe, Co, Al, Sn, Au, Th, U, Pu, and/or rare earth element(s). For instance, the tantalum-titanium alloy powder can be a Ta—Ti—Nb alloy or other Ta—Ti-x alloy, where x is one or more elements, other than Ta and Ti. The alloy percentages can be Ta: 20 wt % to 99.9 wt % and Ti: 20 wt % to 99.9 wt %, and for the other non-Ta and non-Ti elements that are metals or non-metals in the alloy, the wt % can be from 0.001 wt % to 70 wt % or form 0.01 wt % to 50 wt %, or from 0.1 wt % to 25 wt % or from 0.1 wt % to 15 wt % or from 1 wt % to 5 wt %, based on the total weight of the alloy. The Ta—Ti-x metal alloy can be tantalum and titanium with one other metal, two other metals, or three or more other metals present but not as impurities. The tantalum in the Ta—Ti-x metal alloy can be the predominate metal (e.g., the tantalum is the metal present in the highest percent based on the weight of the alloy). The tantalum-titanium-x metal alloy can be tantalum and titanium with x being one other metal or element, two other metals or elements, or three or more other metals or elements present but not as impurities.

The tantalum-titanium alloy powder of the present invention can have one or more other properties selected from the following:

a D10 size of from about 5 microns to about 25 microns;
a D90 size of from about 20 microns to about 80 microns; and/or
an oxygen content of from about 20 ppm to about 1000 ppm, such as from about 100 ppm to about 1000 ppm or from 100 ppm to about 250 ppm (based on weight of powder).

The tantalum-titanium alloy powder of the present invention can be a non-aggregated powder, wherein the properties/parameters described herein are for a non-aggregated powder.

The tantalum-titanium alloy powder of the present invention can be a non-agglomerated powder, wherein the properties/parameters described herein are for a non-agglomerated powder.

As an option, the tantalum-titanium alloy powder can be phosphorous doped. For instance, the phosphorous doped levels can be at least 10 ppm, at least 50 ppm, or at least 100 ppm, or, for instance, from about 50 ppm to about 500 ppm, and the like. Phosphoric acid or ammonium hexafluorophosphate and the like are suggested as the forms of phosphorus.

As an option, the tantalum-titanium alloy powder can be doped with other elements, such as yttrium, silica, or one or more other dopants, such as gas and/or metal dopants. The doped levels can be at least 5 ppm, at least 10 ppm, at least 25 ppm, at least 50 ppm, or at least 100 ppm, or, for instance, from about 5 ppm to about 500 ppm, and the like. One or more dopants can be used for grain stabilization and/or for other property enhancements of the powder or the resulting article made from the powder. The dopants can be present in the alloy powder but does not have to be part of the alloy itself. In other words, the dopants can be present to modify the alloy grain structure and are generally used in amounts below 50 ppm and most commonly in amounts below 10 ppm.

As an option, the tantalum-titanium alloy powder can have a nitrogen content of from about 0.01 wt % to about 5 wt % (e.g., from about 0.01 wt % to about 5 wt %, from about 0.01 wt % to about 5 wt %, from about 0.01 wt % to about 5 wt %, from about 0.01 wt % to about 1 wt %, based on the weight of the powder.

As an option, the tantalum-titanium alloy powder can have a phosphorous content of from about 0.001 wt % to about 5 wt % (e.g., from about 0.1 wt % to about 4 wt %, from about 0.1 wt % to about 3 wt %, from about 0.1 wt % to about 2 wt %, from about 0.1 wt % to about 1 wt %, from about 0.2 wt % to about 5 wt %, from about 0.3 wt % to about 5 wt %, from about 0.5 wt % to about 5 wt %, from about 1 wt % to about 5 wt %), based on the weight of the powder.

As an option, the tantalum-titanium alloy powder can have a hydrogen content of from about 0.001 wt % to about 5 wt % (e.g., from about 0.1 wt % to about 4 wt %, from about 0.1 wt % to about 3 wt %, from about 0.1 wt % to about 2 wt %, from about 0.1 wt % to about 1 wt %, from about 0.2 wt % to about 5 wt %, from about 0.3 wt % to about 5 wt %, from about 0.5 wt % to about 5 wt %, from about 1 wt % to about 5 wt %), based on the weight of the powder.

The use of a gas such as nitrogen, phosphorous, and/or hydrogen can further serve as a passivating agent to further stabilize the Ta—Ti alloy powder.

As an option, the tantalum-titanium alloy powder (excluding an optional oxide layer) can consist of less than 500 ppm of elements other than Ta and Ti, such as less than 100 ppm of elements other than Ta and Ti (e.g., 0 ppm to 99 ppm, 1 ppm to 75 ppm, 1 ppm to 50 ppm, 1 ppm to 25 ppm, 1 ppm to 10 ppm, less than 5 ppm). These ppm limits as set forth herein can apply to one element or more than one element or all of the stated elements.

As an option, the Ta—Ti alloy powder can further include a Ta—Ti oxide layer on the tantalum-titanium alloy powder.

The Ta—Ti oxide layer can have a thickness of from about 1 nm to about 20 nm or thicker, such as from about 5 nm to about 20 nm or from about 10 nm to about 20 nm.

As an option, the Ta—Ti oxide layer, if present, can partially encapsulate or fully encapsulate the tantalum-titanium alloy powder. For instance, over 95 vol % or over 99 vol % or over 99.9 vol % or 100 vol % of the Ta—Ti powder can have an oxide layer on the surface that encapsulates over 50%, over 60%, over 70%, over 80%, over 90%, over 95%, over 99%, or 100% of the available external surface area of the Ta—Ti powder.

As an option, the Ta—Ti oxide layer can further include phosphorus. If present, the phosphorus can be present at a level of from about 1 ppm to 5,000 ppm or from about 50 ppm to about 5,000 ppm, such as from about 100 ppm to 4,000 ppm, or from 200 ppm to about 5,000 ppm, or from about 100 ppm to 3,000 ppm or from about 100 ppm to 2,000 ppm, or from about 100 ppm to 1,000 ppm or from about 100 ppm to 500 ppm.

The tantalum-titanium alloy powder of the present invention can be used to form articles or portions thereof or parts thereof.

For instance, the article can be an orthopedic implant or other medical or dental implant. The orthopedic implant can be for a replacement of a hand, ankle, shoulder, hip, knee, bone, total joint reconstruction (arthroplasty), cranial facial reconstruction, or spinal, or other part of the human or animal body. The dental implant can be for facial reconstruction including, but not limited to, mandible or maxilla or as posts to fix false teeth or dentures. The medical or dental implant finds usefulness in humans and other animals such as dogs, cats, and other animals.

The article can be a tracer or marker such as a medical marker, for instance, a radiographic Ta marker.

The article can be a surgical tool or part thereof. The article can be an augment.

The article can be an aerospace part.

The article can be an automotive part.

The article can be nuclear containment part.

The article can be a boss such as a boss for a coil set used in physical vapor deposition processes. The boss can comprise open cellular structures and solid structures.

The article can be any article used in metal deposition processes, such as sputtering targets, or portions thereof, or for structures used to hold sputtering targets and the like. For instance, the article can be a coil set or part thereof for physical vapor deposition processes.

The tantalum-titanium alloy powder of the present invention can be used in spraying (e.g., cold spraying, thermal spraying) of alloy for coatings and/or repairs of articles or surfaces.

The tantalum-titanium alloy powder of the present invention can be used in metal injection molding applications and processes.

The tantalum-titanium alloy powder of the present invention can be made using a plasma heat-treating process. For instance, a process to make the tantalum-titanium alloy powder of the present invention can comprise, consists essentially of, consists of, or include step a: plasma heat-treating a starting tantalum-titanium alloy powder or wire to at least partially melt at least an outer surface of the starting tantalum-titanium alloy powder or wire in an inert atmosphere to obtain a heat-treated tantalum-titanium alloy powder, and then step b: cooling the heat-treated tantalum-titanium alloy powder in an inert atmosphere to obtain said tantalum-titanium alloy powder. The starting tantalum-titanium alloy powder or wire can be fully melted or at least 90% by weight melted by the plasma treatment (e.g., in the plasma torch region of the plasma reactor).

In the process, the starting tantalum-titanium alloy powder or wire can be an ingot derived tantalum-titanium alloy powder (or wire) or be any other source for the starting tantalum-titanium alloy powder or wire.

The starting tantalum-titanium alloy powder (or wire) can be obtained by taking a starting tantalum source (e.g., tantalum powder or ingot or bar or strip/sheet or scrap) and a starting titanium source (e.g., titanium powder or ingot or bar or strip/sheet or scrap) and melting the starting tantalum source and starting titanium source and combining the melted tantalum and melted titanium together and allowing the combined melted tantalum and titanium to solidify to obtain an Ta—Ti alloy ingot.

The starting tantalum source for melting can be what is considered basic lot powder, such as basic lot tantalum or other sources of tantalum.

The starting tantalum source for melting can be an ingot or an ingot-derived tantalum.

The starting tantalum source for melting can be powder metallurgy (powder-met) derived tantalum.

The starting titanium source for melting can be powder metallurgy (powder-met) derived titanium or sponge.

The starting titanium source for melting can be an ingot or an ingot-derived titanium.

The starting titanium source for melting can be commercially available titanium powder.

If the starting tantalum source and/or titanium source is initially in powder form, the powder can be formed into a mass or green log, such as by cold or hot isostatic pressing followed by sintering, to provide an easier and more controllable medium to melt in the alloying process. The starting tantalum powder can be pre-blended with the titanium powder as an option. The sintering can occur at conventional sintering temperatures for tantalum powder. For instance, and only as an example, the powder can be sintered at a temperature of from about 700 deg C. to about 1,450 deg C. (or from about 800 deg C. to about 1,400 deg C., or from about 900 deg C. to about 1,300 deg C.). The sintering time can be from 1 minute to several hours, such as from about 10 minutes to 4 hours or from 10 minutes to 3 hours, or from about 15 minutes to about 2 hours or from about 20 minutes to about 1 hour or other time periods. As an option, one or more heat treatments or sinterings can occur, whether at the same temperature, same times, or at different temperatures and/or different heat treatment times. The sintering can occur in an inert atmosphere such as an argon atmosphere. The sintering can occur in a conventional furnace used for sintering of metal powders.

The starting Ta—Ti powder (or wire) used to form the final product of the present invention can be made in a number of ways. As one option, a first powder comprising tantalum or an oxide thereof (e.g., tantalum containing solid) is blended with a second powder comprising titanium or a titanium-containing solid. An alternative method is to compact bar or sheet (strip) stock alternating Ti and Ta and bonding via welding or explosion bonding (cladding).

For purposes of the present invention, a titanium-containing solid is any solid which can subsequently be reduced to a liquid state to impart elemental titanium in a tantalum metal. Further, a tantalum-containing solid is any solid material containing at least tantalum which can be reduced into a liquid state to form a tantalum metal. An example of a tantalum-containing solid would be tantalum powder or tantalum scrap and the like.

After the starting Ta and Ti powders are blended to form a blend, the blend is then reduced to a liquid state, such as by melting. The manner in which the blend is reduced to a liquid state, such as by melting, can be accomplished by any means. For instance, the melting can be accomplished by electron-beam melting, vacuum arc remelt processing, or plasma melting individually or in combination.

Once the blend has been reduced to a liquid state, the liquid blend can then be allowed to form into or return to a solid state and form a solid alloy by any means including chilling in a crucible, such as a water-cooled copper crucible, or atomizing (e.g., gas or liquid atomizing), rapid solidification processes, and the like.

In this process, generally any amount of titanium-containing compound or elemental titanium can be used or introduced to the tantalum metal as long as the amount will still result in a tantalum-titanium alloy being formed.

If the alloy to be made is to contain other elements besides the Ta and Ti, the blend can further optionally contain other ingredients, additives, or dopants to achieve these desired other components of the alloy in the desired amounts.

In an option, the powder blend is reduced into a liquid state by electron beam melting (in a vacuum) wherein the blend can be melted at any rate including a rate of from about 200 lbs. per hour to about 700 lbs. per hour, using, for instance a 1200 KW Leybold EB furnace which can casts into a 10 to 12 inch ingot. Any size ingot can be made depending on the type of EB furnace and its cooling capability.

As an option, the alloy subsequently formed is reduced to the liquid state or melted more than one time, and preferably at least two or more times. When melting at least two times, the first melting rate can be slower than the second or more meltings. For instance, the first melt rate can be from about 200 lbs to about 500 lbs per hour and the second melt can have a melt rate of from about 600 lbs to about 800 lbs per hour. Thus, the alloy, once formed, can be reduced into the liquid state any number of times to further result in a more purified alloy.

In the option to form the alloy ingot that is then reduced to a powder, the alloy ingot can have or be any volume or diameter or shape. The electron beam processing or other device used for melting can occur at a melt rate of from about 300 lbs. to about 800 lbs. per hour using 20,000 volts to 28,000 volts and 15 amps to 40 amps, and under a vacuum of from about $1\times10^{-3}$ Torr to about $1\times10^{-6}$ Torr. More preferably, the melt rate is from about 400 lbs. to about 600 lbs. per hour using from 24,000 volts to 26,000 volts and 17 amps to 36 amps, and under a vacuum of from about $1\times10^{-4}$ Torr to $1\times10^{-5}$ Torr. With respect to the VAR processing, the melt rate is preferably of 500 lbs. to 2,000 lbs. per hour using 25 volts to 45 volts and 12,000 amps to 22,000 amps under a vacuum of $2\times10^{-2}$ Torr to $1\times10^{-4}$ Torr, and more preferably 800 lbs. to 1200 lbs. per hour at from 30 volts to 60 volts and 16,000 amps to 18,000 amps, and under a vacuum of from $2\times10^{-2}$ Torr to $1\times10^{-4}$ Torr.

The alloy ingot can have a diameter of at least 4 inches or at least 8 inches, or have a diameter of at least 9½ inches, at least 11 inches, at least 12 inches, or higher. For instance, the alloy ingot can have a diameter of from about 5 inches to about 20 inches or from about 9½ inches to about 13 inches, or from 10 inches to 15 inches, or from 9½ inches to 15 inches, or from 11 inches to 15 inches. The height or length of the ingot can be any amount, such as at least 5 inches or at least 10 inches or at least 20 inches, at least 30 inches, at least 40 inches, at least 45 inches, and the like. For instance, the length or height of the ingot can be from about 20 inches to about 120 inches or from about 30 inches to about 45 inches. The ingot can be cylindrical in shape, though other shapes can be used. After the formation of the ingot, optionally, the ingot can be machine cleaned using conventional techniques. For instance, the machine cleaning (off the surface) can result in a reduction in the diameter of the ingot, such as diameter reduction of from about 1% to about 10%. As a specific example, the ingot can have a nominal as-cast diameter of 12 inches and, due to machine cleaning, can have a diameter after machine cleaning of 10.75 to 11.75 inches in diameter.

Another process of making the alloy of the present invention involves reducing into a liquid state a titanium-containing solid and a tantalum-containing solid. In this process, the titanium-containing solid can be reduced into a liquid separately and the tantalum-containing solid can be also reduced into a liquid state separately. Then, the two liquid states can be combined together. Alternatively, the titanium-containing solid and tantalum-containing solid can be added together as solids and then subsequently reduced into a liquid or gaseous state.

Once the titanium-containing solid and tantalum-containing solid are reduced to a liquid state such as by melting, the two liquids are then mixed together to form a liquid blend which is subsequently formed into a solid alloy. Like the previously described process, additional ingredients, additives, and/or dopants can be added during the process.

The alloy ingot of the present invention generally can have any grain size including the grain size typically found in pure or substantially pure tantalum metal. Preferably, the alloy has a grain size of from about 50 microns to about 210 microns and more preferably from about 60 microns to about 125 microns when heated at 1800 degree C. for 30 minutes. Also, preferably, the alloy can have a grain size of from about 19 microns to about 27 microns when heated at 1530 degree C. for 2 hours.

Another method to make the starting Ta—Ti alloy can involve a flame synthesis process. In more detail, a flamed particle formation process can be used that is similar to the processes described in U.S. Pat. Nos. 7,442,227 and 5,498,446, incorporated in their entirety by reference herein. More specifically, an alkali metal feed, preferably a sodium feed, is injected into a flame reactor and a separate feed of a halide containing the titanium and a halide containing the tantalum are introduced as a feed or feeds into a flame reactor as well. The halide that contains the Ti can be $TiCl_4$, and the halide that contains the Ta can be $TaCl_5$. These three feeds are then introduced (e.g., injected) into the flame reactor. The feeds that contain the titanium halide and the tantalum halide can be combined prior to their entry into the flame reactor or introduced separately into the flame reactor. The introduction of the feeds can be generally under an inert gas environment, such as argon. In the flame reactor, the various feeds, as an option, can be converted to a vapor or the feeds can be fed into the reactor as a vapor. The titanium and tantalum halides react with the alkali metal to form the Ta—Ti alloy powders which typically are in the presence of a halide, such as sodium chloride. Primary particles are nucleated and grown and ultimately aggregates of these particles can be formed and can be encapsulated within a salt, such as sodium chloride, and eventually solidified such that the Ta—Ti alloy powders are encapsulated by the salt, e.g., sodium chloride. Excess sodium is then removed through various techniques, and the Ta—Ti alloy particles coated with the salt, such as sodium chloride, are generally collected through a particle collection or filters which can be under an inert gas or other non-reactive environment. As an option, further heat treatment in an inert gas or vacuum environment can be used and this can increase the primary particle size. Ultimately, the sodium chloride can be removed (e.g., washed away or dissolved away, or sublimed) and the Ta—Ti alloy powder is recovered. Flow straighteners can be used to maintain the feeds in a proper direction and alignment and, preferably, the reactants are sheathed in an inert environment.

Once the Ta—Ti alloy ingot is formed, the ingot can be reduced to a powder or particulate form so that the powder can be processed (e.g., plasma-treated) to form the spherical Ta—Ti powder of the present invention.

Alternatively, once the Ta—Ti alloy ingot is formed, the ingot can be formed or drawn out into wire so that the wire can be processed (e.g., plasma-treated) to form the spherical Ta—Ti powder of the present invention. For instance, the ingot can be divided or formed into bars and the bars can then be rolled, for instance to 9 mm×9 mm and annealed for instance at 1300 degree C. or annealing temperatures, for one or two or more hours. The bars can then be subsequently drawn through various dies to obtained the desired diameter for instance 0.25 mm or other diameters for the starting Ta—Ti alloy wire. Other convention techniques to form a wire from an ingot or plate or bar can be utilized.

The alloy ingot can be reduced to a powder by making the ingot brittle and then crushing the ingot or subjecting the ingot to one or more particle reduction steps, such as milling, jaw crushing, roll crushing, cross beating and the like. To make the ingot brittle, the ingot can be hydrided such as by placing the ingot in a furnace with a hydrogen atmosphere. For instance, the alloy ingot can be heated and then allowed to cool to room temperature in a vessel while a positive hydrogen pressure of from +1 psi to +5 psi or more is maintained. The crushing or particle reduction step(s) can form an angular powder.

After hydriding and reducing to a powder, the powder can be optionally screened to obtain a more desirable particle size distribution. A vibratory screener or ultrasonic screener can be used. Desirable particle size distributions achieved with screening are 5 to 300 microns, such as from 5 to 15 microns, from 15 to 45 microns, or from 45 to 150 microns.

Before or after the optional screening step, the powder or screened powder can be subjected to a dehydriding step. For instance, the powder can have the hydrogen removed by heating in a vacuum furnace—e.g. 30 minutes at 1100 deg C.

After the dehydriding step, the powder can be subjected to one or more deoxidation steps. Deoxidation can be achieved using appropriate reductants for example, C, CO, Mg, Ca, H, Li, Na, and/or K. For instance, a magnesium deoxidation can be used. As an example, from about 4 wt % to about 6 wt % magnesium by total weight of alloy powder can be used during the magnesium deoxidation step and the temperature at which this magnesium deoxidation step occurs can be at a temperature of from about 700 to about 1600 degree C., such as from about 750 to about 950 degree C., or from about 750 to about 800 degree C. The magnesium deoxidation can be accomplished in an inert atmosphere, like argon. Also, the magnesium deoxidation is generally for a sufficient time and at a sufficient temperature to remove at least a significant portion of the oxygen in the alloy powder. For instance, the length of time for the magnesium deoxidation can be from about 20 minutes to about 3 hours, such as from about 45 minutes to about 60 minutes. The magnesium that is used generally vaporizes and precipitates out, e.g. as $MgO_2$, for instance, on the cold wall of the furnace in this magnesium deoxidation step. Any remaining magnesium can be removed or substantially removed by any process such as acid leaching with a dilute nitric acid and hydrofluoric acid solution.

Crushing can be accomplished via industry accepted methods, such as impact mills, air mills, roller mills, or other methods.

As an option, the starting alloy powder (e.g. starting angular alloy powder) can be non-hydrided or can be hydrided before being introduced into the plasma treatment.

With regard to the plasma heat-treating, this can also be known as plasma treatment or plasma processing. In the present invention, a RF plasma treatment or induction plasma treatment can be used. For instance, an RF thermal plasma system or an induction plasma reactor can be used, such as one from Tekna, Sherbrooke, QC, Canada, such as a PL-35LS or PL-50 or TEK-15 or other models. The central gas for the plasma can be argon, or a mixture of argon with other gases, or other gases such as helium and the like. The feed rate of the central gas can be a suitable flow such as from about 10 L/min to about 100 L/min or from about 15 L/min to about 60 L/min or other flow rates. The sheath gas for the plasma can be argon, or a mixture of argon with other gases, or other gases such as other inert gases or helium and the like. The feed rate of the sheath gas can be a suitable flow such as from about 10 L/min to about 120 L/min or from about 10 L/min to about 100 L/min or other flow rates. The carrier gas for the starting alloy powder can be argon, or a mixture of argon with other gases (e.g., hydrogen can be added to increase the plasma intensity), or other gases such as other inert gases or helium and the like. The feed rate of the carrier gas can be a suitable flow such as from about 1 L/min to about 15 L/min or from about 2 L/min to about 10 L/min or other flow rates. The feeding rate of the starting alloy powder (or wire) into the plasma torch area can be any flow rate, such as from about 1 g/min of alloy powder to about 120 g/min or from about 5 g/min to about 80 g/min of starting alloy powder (or wire). Generally, a lower feed rate of the starting alloy powder (or wire) ensures more uniform and more complete spheroidal processing of the starting alloy powder (or wire). After exiting the plasma torch area, a quench gas can be optionally used, such as through one or more quenching ports. The quench gas can be any suitable non-reactive gas, such a helium or argon. If used, the quenching gas can be fed at a variety of flow rates. For instance, the flow rate of the quench gas can be from about 25 L/min to 300 L/min or from about 50 L/min to about 200 L/min or other amounts. As an option, instead of or in addition to using a quench gas, gravity and/or a water-cooled cooling jacket can be used. The designs described in U.S. Pat. No. 5,200,595 and WO 92/19086 can be used. As an option, a passivation gas can be used after the powder is quenched or after the powder begins to cool down. The passivation gas can be oxygen, air, or a combination of air and oxygen. The flow rate of the passivation gas can be any flow rate, such as a flow rate of from about 0.1 L/min to about 1 L/min or other amounts. The chamber pressure of the plasma torch can be any suitable pressure, such as from about 0.05 MPa to about 0.15 MPa. The plate voltage can be from about 5 kV to about 7.5 kV. The frequency of the RF plasma system can be 3 MHz or other values. The plate current can be from about 2.5 A to about 4.5 A. The power can be from about 15 kW to about 35 kW. The distance from the plasma torch to the feeding nozzle or the probe position can be adjusted or varied. The distance can be 0 cm, or about 0 cm or from about 0 cm to about 8 cm. The greater the distance, the less surface evaporation of the starting powder. Thus, if the starting alloy powder is very irregular and has aspect ratios of over 2 or over 3, an option is to have the distance of the feeding nozzle close to 0 cm. If the starting alloy powder is more regular in shape, such as having aspect ratios of from about 1.3 to 2, the distance of the feeding nozzle can be further away from the plasma torch as an option. Also, a higher plasma powder setting can also be used to handle more irregular shaped starting alloy powders.

As an option, the powder that has been plasma treated can be collected, such as collected under a protective atmosphere, such as an inert gas like argon. The collected powder can be passivated, such as using a water bath. The collected powder can be introduced into a water bath (e.g., submerged in a water bath).

As an option, the collected powder can be subjected to a sonication or other powder vibratory methods or the powder can be subjected to an adjustment of solution pH and/or isoelectric point to remove small particles such as nano materials deposited on the alloy surface of the alloy spheres (e.g., removing satellites and other loose material on the spheres). The resulting recovered alloy spheres can optionally be dried, for instance, under a protective gas, such as an inert gas, like argon. This drying can be at any temperature, for instance, at a temperature of 50 deg C. to 100 deg C. for 10 mins to 24 hours, or 1 hour to 5 hours and the like. The recovered powder can be put in sealed bags such as aluminum lined anti-static bags or stainless steel UN containers or HDPE plastic antistatic sealed container or other suitable metal powder storage container for further use.

With the plasma treatment used in the present invention, the effort put into creating the particle size distribution of the starting alloy powder (if that form is used) and/or other morphology can carry through to the finished alloy powder exiting the plasma process. Put another way, the size of the particle can be substantially maintained except for removing sharp edges and/or removing surface roughness and/or making the starting alloy powder spherical or more spherical. Thus, prior to introducing the starting alloy powder into the plasma treatment, the starting alloy powder can be subjected to one or more steps to achieve desirable particle size distributions and/or other particle characteristics. For instance, the particle size distribution of the starting alloy powder can be such that the D10 and/or D90 are within 50%, or within 40%, or within 30%, or within 25%, or within 20%, or within 15%, or within 10% or within 5% of the D50 of that starting alloy powder.

The starting alloy powder prior to being introduced into the plasma treatment can be subjected to one or more sieving steps or other particle screening steps, for instance to obtain a particle size distribution as described above or other sieve cuts, such as, but not limited to, a minus 200 mesh cut, a minus 225 mesh cut, a minus 250 mesh cut, a minus 275 mesh cut, a minus 300 mesh cut, and so on (with mesh being US Mesh sizes).

The starting alloy powder, prior to plasma treating, can have one of the following particle size ranges: the average particle size can be from about 0.5 micron to about 10 microns, or from about 5 microns to about 25 microns, or from about 15 microns to about 45 microns, or from about 35 microns to about 75 microns, or from about 55 microns to about 150 microns, or from about 105 microns to about 250 microns.

In the process to make the alloy powder, the starting alloy powder (if that form is used) can have a first particle size distribution, and the resulting (or finished) alloy powder (e.g., after plasma treatment) can have a second particle size distribution, and the first particle size distribution and the second particle size distribution are within 15% of each other, within 10% of each other, or within 5% of each other, or within 2.5% of each other or within 1% of each other.

The starting alloy powder or wire prior to being introduced into the plasma treatment can be subjected to one or more deoxidation treatments to remove oxygen from the alloy powder or wire.

The starting alloy powder or wire prior to being introduced into the plasma treatment can be subjected to one or more acid leaching treatments to remove impurities from the alloy powder or wire.

The starting alloy powder prior to plasma treating can be classified or sieved to remove various sizes, for instance, removing particles less than 20 microns, less than 15 microns, less than 10 microns, or less than 5 microns.

After exiting the plasma treatment, the plasma-treated alloy powder can be subjected to one or more post-processing steps.

For instance, one post-processing step can be passing the plasma-treated alloy powder through one or more sieves to remove certain sized plasma-treated alloy powder.

For instance, one post-processing step can be sonicating or using other vibratory techniques to remove imperfections from the alloy spheres. For instance, the alloy spheres from the plasma treatment can be put in a water bath and sonicated to remove nano materials on the alloy spheres and then the alloy spheres can be recovered.

For instance, one post-processing step can be optionally subjecting the plasma-treated alloy spheres to at least one deoxidation or 'deox' step. The deoxidation can involve subjecting the plasma-treated alloy to a temperature of from about 500° C. to about 1,000° C. or higher in the presence of at least one oxygen getter. For instance, the oxygen getter can be a magnesium metal or compound. The magnesium metal can be in the form of plates, pellets, or powder. Other oxygen getter material can be used.

For instance, one post-processing step can be optionally subjecting the plasma-treated alloy to one or more heat treatment steps or annealing steps. With regard to the heat treating step of the plasma-treated alloy, the heat treating can occur in a conventional oven under vacuum or under inert temperature. The heat treatment temperature is generally at least 800° C., or at least 1,000° C., or from about 800° C. to about 1,450° C., or from about 1,000° C. to about 1,450° C., and the like. While any heat treatment time can be used, examples include, but are not limited to, at least 10 minutes, at least 30 minutes, from about 10 minutes to about 2 hours, or more. As an option, one or more heat treatments can occur, whether at the same temperature, same times, or at different temperatures and/or different heat treatment times. After heat-treatment, if used, the plasma-treated alloy can maintain the Hall flow rate achieved prior to the heat-treatment or be within 20% or within 10% or within 5% of that Hall flow rate.

For instance, one post-processing step can be subjecting the plasma-treated alloy to acid leaching, such as using conventional techniques or other suitable methods. The various processes described in U.S. Pat. Nos. 6,312,642 and 5,993,513, for example, can be used herein and are incorporated in their entireties by references herein. The acid leaching can be performed using an aqueous acid solution comprising a strong mineral acid as the predominant acid, for example, nitric acid, sulfuric acid, hydrochloric acid, and the like. Also, a hydrofluoric acid (e.g., HF) in minor amounts (e.g., less than 10% by weight, or less than 5% by weight, or less than 1% by weight based on the total weight of acid) can be used. The mineral acid concentration (e.g., $HNO_3$ concentration) can range from about 20% by weight to about 75% by weight in the acid solution. The acid leach can be conducted at elevated temperatures (above room temperature to about 100° C.) or at room temperature, using acid compositions and techniques as shown, for example, in U.S. Pat. No. 6,312,642 B1. The acid leach step typically is performed under normal atmospheric conditions (e.g., approximately 760 mm Hg). The acid leach step performed using conventional acid compositions and pressure conditions, such as indicated, can remove soluble metal oxides from the deoxidized powder for those conditions.

As an option, the plasma-treated alloy powder can be nitrogen doped. With respect to nitrogen, the nitrogen can be in any state, such as a gas, liquid, or solid. The powders of the present invention, can have any amount of nitrogen present as a dopant or otherwise present. Nitrogen can be present as a crystalline form and/or solid solution form at any ratio. Nitrogen doped levels can be from 5 ppm to 5,000 ppm nitrogen or higher.

The plasma-treated alloy powder of the present invention can be used in a number of ways. For instance, the plasma-treated alloy can be used in additive manufacturing or processing which is sometimes referred to as 3-D printing to form an article or part of an article. The plasma-treated alloy powder of the present invention can be used in processes or devices that permit the use of metal powders. With the plasma-treated powder of the present invention, the ease of conducting additive manufacturing is achieved. In addition or alternatively, with the plasma-treated powder of the present invention, the feed of the powder to the additive manufacturing devices is improved and/or the resulting article is more accurately obtained from the design programmed into the printing device.

The additive processes that can utilize the plasma-treated alloy powder of the present invention include laser powder bed fusion, electron beam powder bed fusion, directed energy deposition, laser cladding via a powder or wire, material jetting, sheet lamination, or vat photopolymerization. Additionally, these alloy powders can be used in metal injection molding (MIM).

Some of these additive processes are referred to as laser metal fusion, laser sintering, metal laser melting, or direct metal printing, or direct metal laser sintering. In this process, a high power laser beam is scanned over a bed of powder, sintering the powder in the required shape, in the path of the laser beam. After each layer, the bed is lowered by a short distance and a new layer of powder applied. The entire process runs in a sealed chamber with a controlled gas atmosphere which is either inert (e.g. argon) or active to fine-tune material/product properties.

Some of these additive processes are referred to as laser metal deposition (LIVID) or near net shape. In this process, a high-power laser beam is used, connected to a robot or gantry system, to form a melt pool on a metallic substrate into which powder or metal wire is fed. In LIVID, the powder is contained in a carrier gas and directed to the substrate through a nozzle that is concentric with the laser beam. Alternatively, a wire can be fed from the side. The powder or wire is melted to form a deposit that is bonded to the substrate and grown layer-by-layer. An additional gas jet, concentric with the laser beam, can provide additional shield or process gas protection.

Some of these additive processes are referred to as gas-metal arc welding and plasma welding techniques to melt the metal powder to form a 3D shape layer by layer. In this process, metal powder or wire is added as the electrode melts in the arc and its droplets form layers on the substrate. Processes with lower heat input, such as controlled short-circuit metal transfer, are preferred given the heat sensitivity of most materials used in additive manufacturing. Shielding gases protect the layers against ambient air.

Plasma additive manufacturing is similar to laser metal deposition, where powder or wire is guided towards the substrate in a gas stream and fused by the plasma heat.

Some of these additive processes are referred to as thermal spraying. In this process, molten, heated powder particles or droplets are accelerated in a gas stream towards the substrate, where local adherence is ensured by kinetic energy and heat. When used for additive manufacturing, thermal spraying is applied layer-by-layer to build up components without geometrical complexity, e.g. tubes or reducers. Process gases protect the hot material against ambient atmospheric gases and help to fine-tune material properties.

Some of these additive processes are referred to as electron beam melting or a powder bed fusion process using an electron beam in a vacuum. This process is similar to laser sintering.

The additive manufacturing device or process used to form the articles can have one or more of the following settings: a laser power of from 100 W to about 400 W, or from 100 W to about 200 W, or from 155 W to about 200 W; a scan speed of from about 100 mm/s to about 500 mm/s, such as from about 300 mm/s to about 400 mm/s; hatch spacing of from about 20 microns to about 150 microns, such as from about 80 microns to about 120 microns; a layer thickness of from about 10 microns to about 50 microns, such as from about 30 microns to about 40 microns; and/or an energy density of from about 3 J/mm$^2$ to about 20 J/mm$^2$, such as from about 4 J/mm$^2$ to about 6 J/mm$^2$. Sometimes, a lower than maximum laser setting can be utilized so as to reduce thermal input and/or minimize thermal stress and/or minimize part deformation.

In the additive manufacturing process, the article formed can have a solid structure or an open cellular or mesh structure. The forming of open cellular or mesh structures can be especially useful in making the article lighter in weight or density and/or useful in obtaining a desired Young's modulus and/or other desired property without compromising the utility of the article for the desired purpose. The mesh or open cellular structure can be non-uniform, gradient, or uniform. As an option, the mesh or cellular structure can be printed to mimic or simulate the bone density of actual bone.

In the additive manufacturing process, multi-physics modelling through the use of a computer simulation program can be used. With such computer simulations of the additive printing, a desired design (e.g. mesh or open cellular structure) can be created and optimized. Such programs that can be utilized with the additive (3-D) printer include, but are not limited to, Materialise Magics and Autodesk. Other similar simulation programs can be used to generate desired structure and properties for additive printing.

For additive manufacturing, preferably a tantalum or Ta—Ti or Ti baseplate is utilized but other base plates such as stainless steel or stainless steel alloys can be used. Tantalum or Ta—Ti or Ti baseplates can minimize the difference of Coefficient of Thermal Expansion (CTE) and/or the difference in thermal conductivities between the part and base plant. The effect can minimize thermal residual stresses in the part and/or can prevent lift-up of the part from the plate.

With the alloy powder of the present invention and utilizing additive manufacturing processes, it was discovered that desirable tensile properties of the resulting article formed from the alloy powder of the present invention can be achieved. One or more of these properties can be enhanced if the article is annealed such as at a temperature of from about 800 deg C. to about 2,000 deg C. (for instance for 10 mins to 10 hours, or from 30 minutes to 3 hours, or from 1 hour to 2 hours).

With the present invention, the article formed by the additive manufacturing can have a Young's modulus (as measured by ASTM-E111-17) that is within 25% or within 10% or within 5% or within 1% of animal bone, such as human bone. For instance, the modulus of the article can be from 10 to 60 GPa, or from 15 to 50 GPa, or from 20 to 40 GPa. The measurement can be made or measured ultrasonically and/or mechanically. A mechanical measurement can generally result in a 10-30% lower reading in Young's modulus than an ultrasonic measurement.

One or more of the following properties can be achieved with the present invention in forming additive manufactured (AM) objects or articles. Ultimate tensile strength (UTS) can be at least 50% or at least 100% greater than wrought Ta of the same shape. The UTS can be over 50 KSI, over 70 KSI, over 80 KSI, or over 90 KSI, such as from about 50 KSI to about 100 KSI. The Yield Stress can be at least 50% or at least 100% greater than wrought Ta of the same shape. The Yield Stress can be over 35 KSI, over 40 KSI, over 50 KSI, or over 80 KSI, such as from about 35 KSI to about 90 KSI. An annealed additive manufactured alloy article of the present invention can have improved Yield Stress. An annealed additive manufactured alloy article of the present invention can have improved Yield Stress without compromising the UTS. Elongation can be from about 1% to about 50%, such as from about 3 to 40% or from 5% to 35%. An annealed additive manufactured alloy article of the present invention can have improved elongation. With the present invention, a balance of acceptable and/or good UTS, Yield and Elongation are possible.

With the present invention, the article formed by the additive manufacturing can have a high cycle fatigue, HCF (as measured by ASTM-E466) that is within 10% or within 50% of wrought Ta or within 90% or within 50% or wrought Ti. For instance, the fatigue strength of the article can be from 1 to 600 MPa.

With the plasma-treated alloy powder utilized in additive manufacturing, various articles are possible and the quality and accuracy of the article can be excellent. For instance, the article can be an orthopedic implant or other medical or dental implant. The orthopedic implant can be for a replacement of a hand, ankle, shoulder, hip, knee, bone, total joint reconstruction (arthroplasty), cranial facial reconstruction, or spinal, or other part of the human or animal body. The dental implant can be for facial reconstruction including, but not limited to, mandible or maxilla. The medical or dental implant finds usefulness in humans and other animals such as dogs or cats.

The article can be a boss such as a boss for a coil set used in physical vapor deposition processes. The boss can comprise open cellular structures and solid structures.

The article can be any article used in metal deposition processes, such as sputtering targets, or portions thereof, or for structures used to hold sputtering targets and the like. For instance, the article can be a coil set or part thereof for physical vapor deposition processes.

As an option, the plasma-treated alloy can be further processed to form a capacitor electrode (e.g., capacitor anode). This can be done, for example, by compressing the plasma treated powder to form a body, sintering the body to form a porous body, and anodizing the porous body. The pressing of the powder can be achieved by any conventional techniques such as placing the powder in a mold and subjecting the powder to a compression by use of a press, for instance, to form a pressed body or green body. Various press densities can be used, and include, but are not limited to, from about 1.0 g/cm³ to about 7.5 g/cm³. The powder can be sintered, anodized, and/or impregnated with an electrolyte in any conventional manner. For instance, the sintering, anodizing, and impregnation techniques described in U.S. Pat. Nos. 6,870,727; 6,849,292; 6,813,140; 6,699,767; 6,643,121; 4,945,452; 6,896,782; 6,804,109; 5,837,121; 5,935,408; 6,072,694; 6,136,176; 6,162,345; and 6,191,013 can be used herein and these patents are incorporated in their entirety by reference herein. The sintered anode pellet can be, for example, deoxidized in a process similar to that described above for the powder.

Further details of the starting alloy powder, the plasma-treated alloy powder, and components formed from the alloy powder are provided below and further form optional aspects of the present invention.

With the methods of the present invention, the alloy powder can be made that can have:
a) an apparent density of from about 4.5 g/cc to about 11 g/cc,
b) a D10 particle size of from about 5 microns to about 25 microns,
c) a D50 particle size of from about 20 microns to about 50 microns,
d) a D90 particle size of from about 30 microns to about 100 microns, and/or
e) a BET surface area of from about 0.05 m²/g to about 20 m²/g.

The alloy powder can have at least one of the following properties:
a) an apparent density of from about 6 g/cc to about 10 g/cc,
b) a D10 particle size of from about 12 microns to about 25 microns,
c) a D50 particle size of from about 20 microns to about 40 microns,
d) a D90 particle size of from about 30 microns to about 70 microns, and/or
e) a BET surface area of from about 0.1 m²/g to about 15 m²/g.

For purposes of the present invention, at least one of these properties, at least two, at least three, at least four, or all five properties can be present.

In at least one embodiment of the present invention, the plasma-treated alloy powder (or starting alloy powder) or any article formed with the alloy powder of the present invention, can have the following characteristics, but it is to be understood that the powder or article can have characteristics outside of these ranges:

Purity Levels:
Oxygen content of from about 20 ppm to about 60,000 ppm or about 100 ppm to about 60,000 ppm, such as from about 20 ppm to 1,000 ppm, or from about 40 ppm to about 500 ppm or from about 50 ppm to about 200 ppm, or from about 250 ppm to about 50,000 ppm, or from about 500 ppm to about 30,000 ppm, or from about 1000 ppm to about 20,000 ppm oxygen. An oxygen (in ppm) to BET (in m²/g) ratio can be from about 2,000 to about 4,000, such as from about 2,200 to about 3,800, from about 2,400 to about 3,600, from about 2,600 to about 3,400, or from about 2,800 to about 3,200, and the like.

A carbon content of from about 1 ppm to about 100 ppm and more preferably, from about 10 ppm to about 50 ppm or from about 20 ppm to about 30 ppm carbon.

A nitrogen content of from about 5 ppm to 20,000 ppm, or from about 100 ppm to about 20,000 ppm or higher and more preferably from about 1,000 ppm to about 5,000 ppm or from about 3,000 ppm to about 4,000 ppm or from about 3,000 ppm to about 3,500 ppm nitrogen.

A hydrogen content of from about 1 ppm to about 1,000 ppm, from about 10 ppm to about 1,000 ppm, and more preferably from about 300 ppm to about 750 ppm, or from about 400 ppm to about 600 ppm hydrogen.

An iron content of from about 1 ppm to about 50 ppm, and more preferably from about 5 ppm to about 20 ppm iron.

A nickel content of from about 1 ppm to about 150 ppm, and more preferably from about 5 ppm to about 100 ppm or from about 25 ppm to about 75 ppm nickel.

A chromium content of from about 1 ppm to about 100 ppm and more preferably from about 5 ppm to about 50 ppm or from about 5 ppm to about 20 ppm chromium.

A sodium content of from about 0.1 ppm to about 50 ppm and more preferably from about 0.5 ppm to about 5 ppm sodium.

A potassium content of from about 0.1 ppm to about 100 ppm and more preferably from about 5 ppm to about 50 ppm, or from about 30 ppm to about 50 ppm potassium.

A magnesium content of from about 1 ppm to about 50 ppm and more preferably from about 5 ppm to about 25 ppm magnesium.

A phosphorus (P) content of from about 1 ppm to about 500 ppm, or from about 5 ppm to about 500 ppm and more preferably from about 100 ppm to about 300 ppm phosphorus.

A fluoride (F) content of from about 1 ppm to about 500 ppm and more preferably from about 25 ppm to about 300 ppm, or from about 50 ppm to about 300 ppm, or from about 100 ppm to about 300 ppm.

The plasma treated powder (or starting alloy powder) (primary, secondary, or tertiary) can have a particle size distribution (based on overall %) as follows, based on U.S. mesh size:

+60# of from about 0.0 to about 1% and preferably from about 0.0 to about 0.5% and more preferably 0.0 or about 0.0.

60/170 of from about 45% to about 70% and preferably from about 55% to about 65%, or from about 60% to about 65%.

170/325 of from about 20% to about 50% and preferably from about 25% to about 40% or from about 30% to about 35%.

325/400 of from about 1.0% to about 10% and preferably from about 2.5% to about 7.5% such as from about 4 to about 6%.

400 of from about 0.1 to about 2.0% and preferably from about 0.5% to about 1.5%.

The plasma-treated alloy powders of the present invention can have a BET surface area of from about 0.01 m²/g to about 20 m²/g, and more preferably from about 0.05 m²/g to about 5 m²/g such as from about 0.1 m²/g to about 0.5 m²/g. The determination of BET surface area can be measured with a Micromeritics TriStar II Plus 3030 device.

The raw or starting alloy powder may comprise primary particles that have an average size in the range of 1 micron to about 500 micron, or 10 micron to 300 micron, or 15 micron to 175 micron, or 20 micron to 150 micron, or 25 micron to 100 micron, or 30 micron to 90 micron, or other sizes. The average size and distribution of the primary particle sizes can depend on the method of preparation. The primary particles may tend to form clusters or agglomerates of larger size than the primary particles. The shapes of raw or starting alloy powder particles may include, but are not limited to, flaked, angular, nodular, or spherical, and any combinations thereof or variations thereof. The raw powder used to practice the present invention can have any purity with respect to the tantalum metal and titanium metal with higher purities being preferred. For instance, the alloy purity (e.g., by wt %) of the raw or starting powder can be 95% or greater, or 99% or greater such as from about 99.5% or greater and more preferably 99.95% or greater and even more preferably 99.99% or greater, or 99.995% or greater or 99.999% or greater, with % being a reference to the Ta—Ti alloy purity by weight based on total weight of the alloy.

At any stage, before or after plasma-treatment, the alloy powder can be passivated using an oxygen-containing gas, such as air, as part of the plasma-treated alloy powder production process of the present invention. Passivation typically is used to form a stabilizing oxide film on the powder during processing and in advance of sintered body formation using the powder. A powder production process of the present invention therefore can include hydrogen doping and passivating operations.

Passivating the alloy powder can be by any suitable method. Passivation can be achieved in any suitable container, for example, in a retort, a furnace, a vacuum chamber, or a vacuum furnace. Passivation can be achieved in any of the equipment used in processing, such as heat treating, deoxidizing, nitriding, delubing, granulating, milling, and/or sintering, the metal powder. The passivating of the metal powder can be achieved under vacuum. Passivation can include backfilling of the container with an oxygen containing gas to a specified gas pressure, and holding the gas in the container for a specified time. The oxygen content level of the gas used in powder passivation can be from 1 to 100 wt % oxygen, or from 1 to 90 wt %, or from 1 to 75 wt %, or from 1 to 50 wt %, or from 1 to 30 wt %, or from 20 to 30 wt %, or an oxygen content that is the same as or greater than that of air or atmospheric air, or other content levels. The oxygen can be used in combination with an inert gas, such as nitrogen, argon, or combinations of these, or other inert gases. The inert gas does not react with the alloy during the passivation process. The inert gas, such as nitrogen gas and/or argon gas, preferably can compose all or essentially all (e.g., >98%) of the remaining portion of the passivating gas other than the oxygen. Air can be used as the passivating gas. Air can refer to atmospheric air or dry air. The composition of dry air typically is nitrogen (about 75.5 wt %), oxygen (about 23.2 wt %), argon (about 1.3 wt %), and the rest in a total amount of less than about 0.05%. The content level of hydrogen in dry air is about 0.00005 vol %.

Additional techniques that may be employed for the passivation process can be adapted from those disclosed in U.S. Pat. No. 7,803,235, which is incorporated in its entirety by reference herein.

The present invention will be further clarified by the following examples, which are intended to be purely exemplary of the present invention.

EXAMPLES

Example 1—Theoretical

In this example, a spheroidal Ta—Ti powder was formed. First, basic lot alloy powder was used and had a BET of 0.1 m²/g. This basic lot tantalum powder (sodium reduced powder) was blended with commercially available titanium powder having a BET of 0.4 m²/g obtained from a Ti sponge. The blending amounts of tantalum and titanium was 80 wt % tantalum powder and 20 wt % titanium powder. The blended powder mixture was then pressed and sintered into green logs utilizing a sinter temperature 2500 deg C. to 3000 deg C. for three hours. The green logs were fed into an e-beam furnace where the metal was melted via a crucible. The melt was drawn through a die where the melt solidified and formed the alloy ingot. The alloy ingot was then re-melted using the same e-beam process two additional times. The resulting alloy ingot was then hydrided using a high temperature furnace with a hydrogen atmosphere and allowed to cool to room temperature after hydriding. The hydrided ingot was then crushed (using a jaw crush and then a roll crush) and screened to a sieve side of −20 #. The crushed ingot was screened to a desired size cut which was 10-25 microns or 15-40 microns or 45-105 microns. The screened powder for each lot was then acid leached. The powder in each lot was then subjected to deoxidation using magnesium chips (700 deg C. for 2 hours) to lower the oxygen levels to various levels, all below 1000 ppm. Each lot was then separately subjected to plasma treating as described below. It is also mentioned that besides the initial deoxidation for each lot, an additional deoxidation (with magnesium chips for 2 hours at 700 deg C.) was conducted after spheroidization (a double deoxidation) to achieve ultra low oxygen impurity powders.

Next, the starting angular alloy powder was then plasma treated. Particularly, the alloy powder was spheroidized by introducing the alloy powder into a feeder. The feeder had an argon supply (5 LPM) that aerosolizes the powder into the plasma spheroidization reactor (TEKSPHERO 15, from Tekna, Canada). The feed rate of the powder was maintained at 0.75 kg/hr by adjusting the feeder. The aerosolized powder was introduced into the plasma heat source of the plasma reactor. The plasma reactor had an induction plasma torch using a design described in U.S. Pat. No. 5,200,595 and WO 92/19086 using concentric tubes. The plasma energy used to spheroidize the powder was 15 KW with plate voltage set at 6.5 V, plate current set at 2.3 A and grid current set at 0.4 A. The reactor was inerted using argon gas flow with carrier gas flow set at 5 LPM, sheath gas flow set at 30 LPM, central gas flow set at 10 LPM and nozzle gas flow set at 1 LPM. The plasma intensity was increased by adding hydrogen gas (using flow rates of 4 LPM). The run conditions are summarized in Table 1. The basic lot alloy powder introduced into the plasma torch was at least partially melted and then spheroidized, and the liquid drops of alloy were carried downstream from the plasma torch where they cooled rapidly by an active water cooling jacket on the plasma reactor. In this example, the cooled spheroid alloy powder dropped to the bottom of the plasma reactor via gravity and the spheroid powder was collected under argon gas blanket, and passivated in a water bath. Once under water, the slurry was sonicated (energy <150 W/gal.) to remove potential nanomaterials deposited on the surface of the spheroid powder. The washed alloy spheres were then dried under argon at 80° C. for 4 hours. The dried powder was then packaged in Al lined anti-static bags until tested for properties.

TABLE 1

| Feed | Power | Argon gas pressure | Argon Flow - LPM | | | | Hydrogen (LPM) | Plate Voltage (V) | Plate Current (A) | Grid Current (A) | Ta feed rate (kg/hr) |
| | | | Carrier Gas | Shealth Gas | Central Gas | Nozzle | | | | | |
| --- | --- | --- | --- | --- | --- | --- | --- | --- | --- | --- | --- |
| Tantalum | 15 KW | 15 psia | 5 | 30 | 10 | 1 | 4 | 6.55 | 2.3 | 0.4 | 0.75 |

The powders produced were spherical with an aspect ratio determined by SEM in the range of 1.0-1.2. The powder Hall flow rate was 7.5+/−2.0 s for 50 g and the apparent density was 8 g/cm$^3$+/−2.0 g/cm$^3$. Powder PSD measured by dynamic light scattering was D10=5-15 microns, D50=10-30 microns and D90=20-50 microns. The purity of the alloy powder was at least 99.95% Ta—Ti with all gas impurities being less than 1000 ppm.

Example 2—Theoretical

The alloy powder of Example 1 was used in a 3D printing or additive manufacturing process. Specifically, alloy builds were performed on a EOS M290 with a build volume of 250×250×325 mm and maximum laser power of 400 W. The base plate used was Type 316 austenitic chromium nickel stainless steel.

In the experiment, the spheroidized alloy powder of Example 1 was sufficient for Laser Powder Bed (L-PBF) printing and fully dense tensile bars and demonstration parts, with alternating solid and mesh aspects and remarkable overhang, were produced. Specifically, tensile bars were printed with 1 mm oversize to standard dimensions (ASTM E8). The bars were machined to final dimensions on a lathe. Tensile properties were measured on an Instron 4210 Tensile Tester. Tensile bars were analyzed for microstructure and hardness. For microstructure analysis, the samples were mounted in epoxy, and cut with a diamond saw. The mounted sample was polished and etched in acid and the grains were characterized on a Unition Versamet 2 metallographic microscope. Microhardness was tested using a LECO LM700-AT Tester with AMH32 Software.

The printing parameters and laser parameters used were the preferred parameters mentioned earlier. The results included a >99.5% density with good overhang in the test build. Several porous cubes were printed as well in this experiment and this demonstration part showed high resolution (<30 um) of features with the ability to successfully print open cellular structures. This mesh-solid structure is often required for lightweight additively manufactured aerospace components and industrial parts, as well as for medical implants to allow improved osteointegration.

Compared to pure titanium and pure tantalum, the present invention's tensile bars showed tensile properties 10-30% lower for Ta—Ti alloy test bars.

Example 3 (Part Actual—Part Theoretical)

(Actual) A salt-encapsulated alloy powder having a mass ratio of Ta to Ti of 80:20 was manufactured by the flame synthesis process as described in U.S. Pat. No. 7,442,227. Vaporous titanium chloride and tantalum chloride (halides) were introduced with argon into a reactor through a central tube at mass ratio of 0.67 TiCl$_4$ to TaCl$_5$. A concentric Ar flow was positioned between the halides and the vaporous sodium flow which was provided in excess. As described in U.S. Pat. No. 7,442,227, the sodium chloride byproduct acted as a condensable vaporous material to arrest the sintering behavior of the particles. This salt encapsulated metal alloy powder was collected and washed with deionized water to remove the coating of sodium chloride. Dilute nitric acid was used to aid particle settling. This washing process introduced a thin oxide passivation layer onto the surface of the particle which was maintained as the particles were dried under vacuum. The resultant Ta—Ti alloy powder was then pressed to a density of 2.0 g/cm$^3$ (Theoretical) Once the de-hydrided powder goes through the plasma spheroidization it is unlikely either Na or Cl will remain in the final spheroid.

The resulting alloy powder was then hydrided using a high temperature furnace with a hydrogen atmosphere and allowed to cool to room temperature after hydriding. The hydrided powder was then crushed (using a jaw crush and then a roll crush) and screened to a sieve side of −20 #. The crushed powder was screened to a desired size cut which was 10-25 microns or 15-40 microns or 45-105 microns. The screened powder for each lot was then acid leached. The powder in each lot was then subjected to deoxidation using magnesium chips (700 deg C. for 2 hours) to lower the oxygen levels to various levels, all below 1000 ppm. Each lot was then separately subjected to plasma treating in the same manner as Example 1. It is also mentioned that besides the initial deoxidation for each lot, an additional deoxidation (with magnesium chips for 2 hours at 700 deg C.) was conducted after spheroidization (a double deoxidation) to achieve ultra low oxygen impurity powders.

The present invention includes the following aspects/embodiments/features in any order and/or in any combination:

1. Tantalum-titanium alloy powder comprising
   a. from 20 wt % to 80 wt % of tantalum and from 20 wt % to 80 wt % of titanium;
   b. a spherical shape wherein the powder has an average aspect ratio of from 1.0 to 1.25;
   c. an average particle size of from about 0.5 micron to about 250 microns;
   d. an apparent density from about 4.5 g/cc to about 11 g/cc;
   e. a true density of from 6.5 g/cc to 15.5 g/cc; and
   f. a Hall flow rate of 30 sec or less.
2. The tantalum-titanium alloy powder of any preceding or following embodiment/feature/aspect, wherein said alloy powder is plasma heat-treated.
3. The tantalum-titanium alloy powder of any preceding or following embodiment/feature/aspect, wherein said alloy powder has an oxygen level of less than 500 ppm.
4. The tantalum-titanium alloy powder of any preceding or following embodiment/feature/aspect, wherein said alloy powder has an oxygen level of from 20 ppm to 250 ppm.

5. The tantalum-titanium alloy powder of any preceding or following embodiment/feature/aspect, wherein said alloy powder wherein said average aspect ratio is from 1.0 to 1.1.
6. The tantalum-titanium alloy powder of any preceding or following embodiment/feature/aspect, wherein said alloy powder wherein said average aspect ratio is from 1.0 to 1.05.
7. The tantalum-titanium alloy powder of any preceding or following embodiment/feature/aspect, wherein said tantalum-titanium alloy has less than 500 ppm of non-gaseous elements present.
8. The tantalum-titanium alloy powder of any preceding or following embodiment/feature/aspect, wherein said average particle size is from about 0.5 micron to about 10 microns.
9. The tantalum-titanium alloy powder of any preceding or following embodiment/feature/aspect, wherein said average particle size is from about 5 microns to about 25 microns.
10. The tantalum-titanium alloy powder of any preceding or following embodiment/feature/aspect, wherein said average particle size is from about 15 microns to about 45 microns.
11. The tantalum-titanium alloy powder of any preceding or following embodiment/feature/aspect, wherein said average particle size is from about 45 microns to about 75 microns.
12. The tantalum-titanium alloy powder of any preceding or following embodiment/feature/aspect, wherein said average particle size is from about 55 microns to about 150 microns.
13. The tantalum-titanium alloy powder of any preceding or following embodiment/feature/aspect, wherein said average particle size is from about 105 microns to about 250 microns.
14. The tantalum-titanium alloy powder of any preceding or following embodiment/feature/aspect, wherein said alloy powder has at least one of the following properties:
    a. a D10 size of from about 5 microns to 25 microns;
    b. a D90 size of from about 20 microns to 80 microns; or
    c. oxygen between 100 ppm to 1000 ppm.
15. An article comprising the tantalum-titanium alloy powder of any preceding or following embodiment/feature/aspect.
16. The article of any preceding or following embodiment/feature/aspect, wherein said article is an orthopedic implant or part thereof.
17. The article of any preceding or following embodiment/feature/aspect, wherein said orthopedic implant comprises open cellular structures and solid structures.
18. The article of any preceding or following embodiment/feature/aspect, wherein said article is a dental implant.
19. The article of any preceding or following embodiment/feature/aspect, wherein said dental implant comprises open cellular structures and solid structures.
20. The tantalum-titanium alloy powder of any preceding or following embodiment/feature/aspect, wherein said tantalum-titanium alloy further comprises, as part of the alloy, at least one additional metal element.
21. The tantalum-titanium alloy powder of any preceding or following embodiment/feature/aspect, wherein said tantalum-titanium alloy is the absence of elemental nickel.
22. The tantalum-titanium alloy powder of any preceding or following embodiment/feature/aspect, wherein said tantalum-titanium alloy further comprises, as part of the alloy, at least one element selected from zirconium, niobium, tungsten, molybdenum, hafnium, rhenium, or any combinations thereof.
23. A method for forming an article, said method comprising additive manufacturing said article by utilizing the alloy powder of any preceding or following embodiment/feature/aspect to form the shape of said article or part thereof.
24. The method of any preceding or following embodiment/feature/aspect, wherein said additive manufacturing comprises laser powder bed fusion.
25. The method of any preceding or following embodiment/feature/aspect, wherein said additive manufacturing comprises electron beam powder bed fusion.
26. The method of any preceding or following embodiment/feature/aspect, wherein said additive manufacturing comprises directed energy deposition.
27. The method of any preceding or following embodiment/feature/aspect, wherein said additive manufacturing comprises laser cladding via a powder or wire.
28. The method of any preceding or following embodiment/feature/aspect, wherein said additive manufacturing comprises material jetting.
29. The method of any preceding or following embodiment/feature/aspect, wherein said additive manufacturing comprises sheet lamination.
30. The method of any preceding or following embodiment/feature/aspect, wherein said additive manufacturing comprises vat photopolymerization.
31. A method to make to the tantalum-titanium alloy powder of any preceding or following embodiment/feature/aspect, said method comprising:
    a. plasma heat-treating a starting alloy powder or wire to at least partially melt at least an outer surface of said starting alloy powder or wire in an inert atmosphere to obtain a heat-treated alloy powder, and
    b. cooling said heat-treated alloy powder in an inert atmosphere to obtain said tantalum-titanium alloy powder.
32. The method of any preceding or following embodiment/feature/aspect, wherein said starting alloy powder or wire is an ingot-derived alloy.
33. The method of any preceding or following embodiment/feature/aspect, wherein said starting alloy powder is obtained by a process comprising: i) blending a starting tantalum powder and a starting titanium powder together to form a powder blend, ii) melting said powder blend to form a liquid, iii) solidifying said liquid to an alloy ingot, iv) hydriding said alloy ingot to form a hydrided ingot, v) reducing said hydrided ingot to a hydrided alloy powder, vi) optionally screening said hydrided alloy powder to a particle size range, vii) subjecting said hydrided alloy powder to one or more dehydriding steps to form an alloy powder, viii) optionally subjecting the alloy powder to one or more deoxidation treatments, ix) optionally subjecting the alloy powder to one or more acid leaching steps.
34. The method of any preceding or following embodiment/feature/aspect, wherein said starting alloy wire is obtained by a process comprising: i) blending a starting tantalum powder and a starting titanium powder together to form a powder blend, ii) melting said powder blend to form a liquid, iii) solidifying said liquid to an alloy ingot, iv) drawing down the alloy ingot to a wire, v) optionally subjecting the wire to one or more deoxidation treatments, vi) optionally subjecting the alloy wire to one or more acid leaching steps.

35. The method of any preceding or following embodiment/feature/aspect, wherein said starting alloy powder is obtained by a process comprising: i) condensing a starting tantalum rod or plate and a starting titanium rod or plate together to form a composite laminate, ii) melting said composite laminate to form a liquid, iii) solidifying said liquid to an alloy ingot, iv) hydriding said alloy ingot to form a hydrided ingot, v) reducing said hydrided ingot to a hydrided alloy powder, vi) optionally screening said hydrided alloy powder to a particle size range, vii) subjecting said hydrided alloy powder to one or more dehydriding steps to form an alloy powder, viii) optionally subjecting the alloy powder to one or more deoxidation treatments, ix) optionally subjecting the alloy powder to one or more acid leaching steps.

36. The method of any preceding or following embodiment/feature/aspect, wherein said starting alloy powder has a first particle size distribution, and said tantalum-titanium alloy powder has a second particle size distribution, and said first particle size distribution and said second particle size distribution are within 10% of each other.

37. The method of any preceding or following embodiment/feature/aspect, wherein said starting alloy powder is obtained by a process comprising: i) reacting vaporous $TaCl_5$, vaporous $TiCl_4$ and vaporous Na to form a Ta—Ti powder, ii) compacting the Ta—Ti powder to a compact, iii) removing excess NaCl, iv) hydriding said compact to form a hydrided compact, v) reducing said hydrided compact to a hydrided alloy powder, vi) optionally screening said hydrided alloy powder to a particle size range, vii) subjecting said hydrided alloy powder to one or more dehydriding steps to form an alloy powder, viii) optionally subjecting the alloy powder to one or more deoxidation treatments, ix) optionally subjecting the alloy powder to one or more acid leaching steps.

The present invention can include any combination of these various features or embodiments above and/or below as set forth in sentences and/or paragraphs. Any combination of disclosed features herein is considered part of the present invention and no limitation is intended with respect to combinable features.

Applicant specifically incorporates the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof

What is claimed is:

1. Tantalum-titanium alloy powder comprising:
   a. from 10 to 90 at % of tantalum and from 10 to 90 at % of titanium;
   b. a spherical shape wherein the powder has an average aspect ratio of from 1.0 to 1.25;
   c. an average particle size of from about 0.5 micron to about 250 microns;
   d. an apparent density from about 4.5 g/cc to about 11 g/cc;
   e. a true density of from 6.5 g/cc to 15.5 g/cc;
   f. a Hall flow rate of 30 sec or less; and
   g. an oxygen level from 100 ppm to 1000 ppm, and
   wherein said tantalum-titanium alloy powder has a D10 size of from about 5 microns to 25 microns or a D90 size of from about 20 microns to 80 microns, and wherein said tantalum-titanium alloy powder includes a Ta—Ti oxide layer having an oxide thickness layer of from about 5 nm to about 20 nm, and said oxygen level and the at % of tantalum and at % of titanium excludes the Ta—Ti oxide layer.

2. The tantalum-titanium alloy powder of claim 1, wherein said alloy powder is plasma heat-treated.

3. The tantalum-titanium alloy powder of claim 1, wherein said oxygen level is between 100 ppm and 500 ppm.

4. The tantalum-titanium alloy powder of claim 1, wherein said oxygen level is from 100 ppm to 250 ppm.

5. The tantalum-titanium alloy powder of claim 1, wherein said alloy powder wherein said average aspect ratio is from 1.0 to 1.1.

6. The tantalum-titanium alloy powder of claim 1, wherein said alloy powder wherein said average aspect ratio is from 1.0 to 1.05.

7. The tantalum-titanium alloy powder of claim 1, wherein said tantalum-titanium alloy has less than 500 ppm of non-gaseous elements present.

8. The tantalum-titanium alloy powder of claim 1, wherein said average particle size is from about 0.5 micron to about 10 microns.

9. The tantalum-titanium alloy powder of claim 1, wherein said average particle size is from about 5 microns to about 25 microns.

10. The tantalum-titanium alloy powder of claim 1, wherein said average particle size is from about 15 microns to about 45 microns.

11. The tantalum-titanium alloy powder of claim 1, wherein said average particle size is from about 45 microns to about 75 microns.

12. The tantalum-titanium alloy powder of claim 1, wherein said average particle size is from about 55 microns to about 150 microns.

13. The tantalum-titanium alloy powder of claim 1, wherein said average particle size is from about 105 microns to about 250 microns.

14. An article comprising the tantalum-titanium alloy powder of claim 1.

15. The article of claim 14, wherein said article is an orthopedic implant or part thereof.

16. The article of claim 15, wherein said orthopedic implant comprises open cellular structures and solid structures.

17. The article of claim 14, wherein said article is a dental implant.

18. The article of claim 17, wherein said dental implant comprises open cellular structures and solid structures.

19. The tantalum-titanium alloy powder of claim 1, wherein said tantalum-titanium alloy powder further comprises, as part of the alloy, at least one additional metal element.

20. The tantalum-titanium alloy powder of claim 1, wherein said tantalum-titanium alloy powder is absent of elemental nickel.

21. The tantalum-titanium alloy powder of claim 1, wherein said tantalum-titanium alloy powder further comprises, as part of the alloy, at least one element selected from zirconium, niobium, tungsten, molybdenum, hafnium, rhenium, or any combinations thereof.

22. The tantalum-titanium alloy powder of claim 1, wherein said tantalum-titanium alloy powder has metallic elements consisting of tantalum and titanium.

23. The tantalum-titanium alloy powder of claim 1, wherein said tantalum-titanium alloy powder has from 30 wt % to 70 wt % of tantalum and from 30 wt % to 70 wt % of titanium.

24. The tantalum-titanium alloy powder of claim 1, wherein said tantalum-titanium alloy powder has niobium present in an amount that is 5 wt % or less based on total weight of said tantalum-titanium alloy powder.

25. The tantalum-titanium alloy powder of claim 1, wherein said tantalum-titanium alloy powder has non-gaseous metallic elements, other than said tantalum and said titanium present in an amount of less than 1 wt % based on total weight of said tantalum-titanium alloy powder.

26. A method for forming an article, said method comprising additive manufacturing said article by utilizing the alloy powder of claim 1 to form the shape of said article or part thereof.

27. The method of claim 26, wherein said additive manufacturing comprises laser powder bed fusion.

28. The method of claim 26, wherein said additive manufacturing comprises electron beam powder bed fusion.

29. The method of claim 26, wherein said additive manufacturing comprises directed energy deposition.

30. The method of claim 26, wherein said additive manufacturing comprises laser cladding via a powder or wire.

31. The method of claim 26, wherein said additive manufacturing comprises material jetting.

32. The method of claim 26, wherein said additive manufacturing comprises sheet lamination.

33. The method of claim 26, wherein said additive manufacturing comprises vat photopolymerization.

34. A method to make to the tantalum-titanium alloy powder of claim 1, said method comprising:
  a. plasma heat-treating a starting alloy powder or wire to at least partially melt at least an outer surface of said starting alloy powder or wire in an inert atmosphere to obtain a heat-treated alloy powder, and
  b. cooling said heat-treated alloy powder in an inert atmosphere to obtain said tantalum-titanium alloy powder.

35. The method of claim 34, wherein said starting alloy powder is an ingot-derived alloy.

36. The method of claim 34, wherein said starting alloy powder is obtained by a process comprising: i) blending a starting tantalum powder and a starting titanium powder together to form a powder blend, ii) melting said powder blend to form a liquid, iii) solidifying said liquid to an alloy ingot, iv) hydriding said alloy ingot to form a hydrided ingot, v) reducing said hydrided ingot to a hydrided alloy powder, vi) optionally screening said hydrided alloy powder to a particle size range, vii) subjecting said hydrided alloy powder to one or more dehydriding steps to form an alloy powder, viii) optionally subjecting the alloy powder to one or more deoxidation treatments, ix) optionally subjecting the alloy powder to one or more acid leaching steps.

37. The method of claim 34, wherein said starting alloy powder is obtained by a process comprising: i) condensing a starting tantalum rod or plate and a starting titanium rod or plate together to form a composite laminate, ii) melting said composite laminate to form a liquid, iii) solidifying said liquid to an alloy ingot, iv) hydriding said alloy ingot to form a hydrided ingot, v) reducing said hydrided ingot to a hydrided alloy powder, vi) optionally screening said hydrided alloy powder to a particle size range, vii) subjecting said hydrided alloy powder to one or more dehydriding steps to form an alloy powder, viii) optionally subjecting the alloy powder to one or more deoxidation treatments, ix) optionally subjecting the alloy powder to one or more acid leaching steps.

38. The method of claim 34, wherein said starting alloy powder is obtained by a process comprising: i) reacting vaporous $TaCl_5$, vaporous $TiCl_4$ and vaporous Na to form a Ta—Ti powder, ii) compacting the Ta—Ti powder to a compact, iii) removing excess NaCl, iv) hydriding said compact to form a hydrided compact, v) reducing said hydrided compact to a hydrided alloy powder, vi) optionally screening said hydrided alloy powder to a particle size range, vii) subjecting said hydrided alloy powder to one or more dehydriding steps to form an alloy powder, viii) optionally subjecting the alloy powder to one or more deoxidation treatments, ix) optionally subjecting the alloy powder to one or more acid leaching steps.

39. The method of claim 34, wherein said starting alloy wire is obtained by a process comprising: i) blending a starting tantalum powder and a starting titanium powder together to form a powder blend, ii) melting said powder blend to form a liquid, iii) solidifying said liquid to an alloy ingot, iv) drawing down the alloy ingot to a wire, v) optionally subjecting the wire to one or more deoxidation treatments, vi) optionally subjecting the alloy wire to one or more acid leaching steps.

* * * * *